(12) United States Patent
Kim

(10) Patent No.: US 8,149,662 B2
(45) Date of Patent: Apr. 3, 2012

(54) METHOD AND APPARATUS FOR DETERMINING OPTIMUM LASER POWER

(75) Inventor: Beom Jim Kim, Pyeoagbok-si (KR)

(73) Assignee: LG Electronics Inc., Seoul (KR)

( * ) Notice: Subject to any disclaimer, the term of this patent is extended or adjusted under 35 U.S.C. 154(b) by 763 days.

(21) Appl. No.: 12/027,098

(22) Filed: Feb. 6, 2008

(65) Prior Publication Data
US 2009/0073833 A1    Mar. 19, 2009

(30) Foreign Application Priority Data
Sep. 14, 2007  (KR) .................. 10-2007-0093475

(51) Int. Cl.
*G11B 7/00* (2006.01)
*G11B 20/10* (2006.01)

(52) U.S. Cl. ............... 369/47.53; 369/47.15; 369/53.27

(58) Field of Classification Search ............... 369/47.53, 369/47.51, 57.15, 53.27, 53.17, 47.11, 47.14, 369/53.13, 47.5
See application file for complete search history.

(56) References Cited

U.S. PATENT DOCUMENTS

| | | | |
|---|---|---|---|
| 5,577,011 A * | 11/1996 | Jung | 369/47.11 |
| 6,292,448 B1 | 9/2001 | Yoshida et al. | |
| 7,272,088 B2 * | 9/2007 | Yoshida et al. | 369/47.51 |
| 7,602,683 B2 * | 10/2009 | Katata et al. | 369/47.53 |
| 2006/0203647 A1 | 9/2006 | Yu et al. | |

FOREIGN PATENT DOCUMENTS

| | | |
|---|---|---|
| CN | 1200405 C | 5/2005 |
| CN | 1835099 A | 9/2006 |
| JP | 2000-105924 A | 4/2000 |
| KR | 10-2006-0031235 A | 4/2006 |
| KR | 10-2006-0085513 A | 7/2006 |

\* cited by examiner

*Primary Examiner* — Ali Neyzari
(74) *Attorney, Agent, or Firm* — Birch, Stewart, Kolasch & Birch, LLP

(57) ABSTRACT

A method for determining an optimum laser power for a recording medium. The method includes checking if a portion of an unused area in a test area on the recording medium is defective, and performing an optimum laser power operation in a used area in the test area, in which the used area is a non-defective area that was used to test the optimum laser power for the recording medium.

25 Claims, 17 Drawing Sheets

FIG. 3

| BP | | Contents | Number of bytes |
|---|---|---|---|
| 0 to 31 | No 1 | Drive manufacturer ID | 32 |
| 32 to 47 | | Serial number | 16 |
| 48 to 63 | | Model number | 16 |
| 64 to 67 | | 1st field of Write Strategy code | 4 |
| 68 to 71 | | Recoring power | 4 |
| 72 to 79 | | Time stamp | 8 |
| 80 to 83 | | Power calibration address | 4 |
| 84 to 107 | | Running OPC information | 24 |
| 108 to 113 | | 2nd field of Write Strategy code | 6 |
| 114 to 115 | | Set to (00) | 2 |
| 116 to 117 | | Recording power by 8-bit coded power | 2 |
| 118 to 127 | | Set to (00) | 10 |
| 128 to 159 | No 2 | Drive manufacturer ID | 32 |
| 160 to 175 | | Serial number | 16 |
| ..... | | | |
| 256 to 287 | No 3 | Drive manufacturer ID | 32 |
| 288 to 303 | | Serial number | 16 |
| ..... | | | |
| 384 to 415 | No 4 | Drive manufacturer ID | 32 |
| 416 to 431 | | Serial number | 16 |
| ..... | | | |

METHOD AND APPARATUS FOR DETERMINING OPTIMUM LASER POWER

The present application claims priority to Korean Patent Application No. 10-2007-0093475 filed in Korea on Sep. 14, 2007, which is hereby incorporated by reference as if fully set forth herein.

BACKGROUND OF THE INVENTION

1. Field of the Invention

The present invention relates to a method and apparatus for determining an optimum power of a laser beam incident on a recording medium.

2. Discussion of the Related Art

A variety of storage discs are now available. For example, disc types now include Digital Versatile Disc (DVD), Blu-ray Disc (BD), and High-Density DVD (HD-DVD). Information can be written onto and read from the disc via a recording/reproducing device. Further, the storage discs are generally classified into read-only discs and recordable discs.

Further, the recording/reproducing device illuminates a laser beam with relatively-high energy and that changes a material characteristics of a record layer of the recordable disc, so that information or data can be recorded on the optical disc. In addition, the data recording/reproducing device reproduces information or data from the optical disc using a laser beam with relatively-low energy incapable of changing the material characteristics of the record layer.

In other words, during a recording mode, the recording/reproducing device drives a laser diode (LD) at a relatively high power, and forms pits on the optical disc, so that information or data is recorded in the pits of the optical disc. The recording/reproducing apparatus transmits a relatively low power laser beam onto the disc, and reads the information stored on the disc based on an amount of light reflected from the disc (i.e., the reproducing apparatus determines whether the data on the disc is a 1 or 0 binary data based on the reflected light).

Further, each disc may require different laser powers. Therefore, the data recording/reproducing device searches information on the disc for an optimum laser power, and uses the optimum laser power to record data on the disc. The operation for searching for the optimum laser power is generally called "Power Calibration" or "Optimum Power Control (OPC)".

Further, the recordable disc includes a test area that is used for the OPC process. The data recording/reproducing device records a test signal in the test area, reproduces the recorded test signal, and compares the reproduced test signal with a predetermined reference value, thereby deciding an optimum laser power.

However, due to defects of the test area and/or data throughput problems for the recording/reproducing device, the related art recording/reproducing device has difficulty in effectively performing the OPC process. In addition, when the OPC process is incorrectly performed, the data recording/reproducing device cannot record data at an optimum laser power, so that data is not recorded on the disc. Further, even if the data is recorded on the disc, the data recording/reproducing device cannot accurately reproduce the recorded data.

SUMMARY OF THE INVENTION

Accordingly, one object of the present invention is directed to a method and apparatus for determining an optimum laser power that substantially obviates one or more problems due to limitations and disadvantages of the related art.

Another object of the present invention is to provide a method and apparatus that successfully performs an OPC process even when a defect exists in a test area of the disc.

To achieve these objects and other advantages and in accordance with the purpose of the invention, as embodied and broadly described herein, the present invention provides in one aspect a method for determining an optimum laser power for a recording medium. The method includes checking if a portion of an unused area in a test area on the recording medium is defective, and performing an optimum laser power operation in a used area in the test area, in which the used area is a non-defective area that was used to test the optimum laser power for the recording medium.

In another aspect, the present invention provides an apparatus for determining an optimum laser power for a recording medium. The apparatus includes a pickup unit configured to record data on the recording medium and to read data from the recording medium, and a controller configured to check if a portion of an unused area in a test area on the recording medium is defective, and to perform an optimum laser power operation in a used area in the test area. Further, the used area is a non-defective area that was used to test the optimum laser power for the recording medium.

In still another aspect, the present invention provides a system for determining an optimum laser power for a recording medium. The system includes means for checking if a portion of an unused area in a test area on the recording medium is defective, and means for performing an optimum laser power operation in a used area in the test area, in which the used area is a non-defective area that was used to test the optimum laser power for the recording medium.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an example of recording-management data recorded in a management area of a recording medium according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
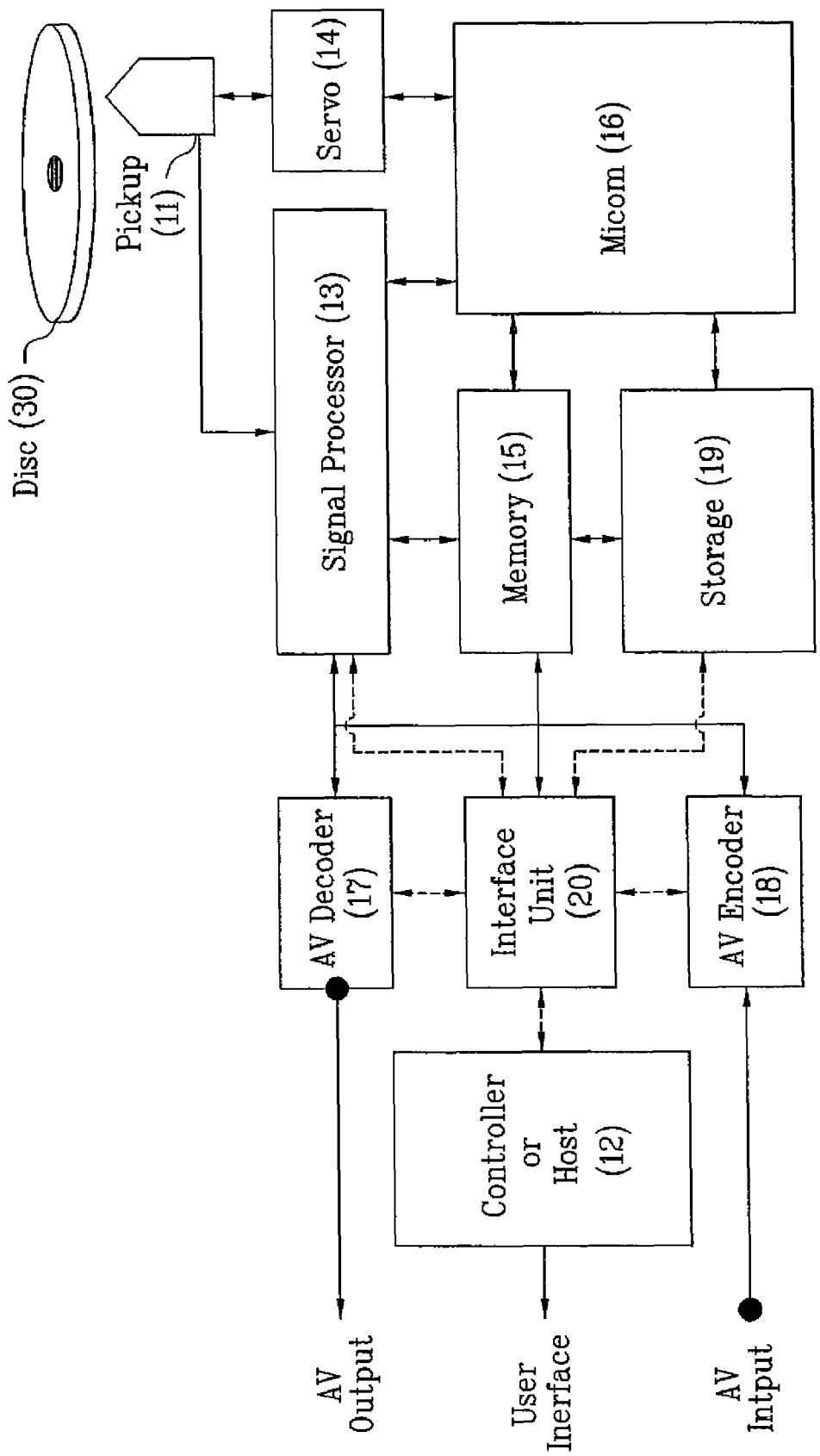
FIG. 1 is a block diagram illustrating a data recording/reproducing device according to an embodiment of the present invention.

FIG. 1 is a block diagram illustrating an apparatus for recording/reproducing data to/from a disc according to an embodiment of the present invention. Further, the recording/reproducing device shown in FIG. 1 can record/reproduce data to and from various optical discs having different formats. In addition, the data recording/reproducing device can also record/reproduce data to and from a specific optical disc (e.g., DVD, BD or HD-DVD) or can reproduce the data from the optical disc without recording the data on the disc.

Also, the data recording/reproducing device shown in FIG. 1 records or reproduces data to and from the disc 30, receives an external input signal, performs a signal process on the received signal, and transmits the signal processed result to an external display (not shown), such that a user can view the signal processed result on the display.

For example, representative external input signals a DMB (Digital Multimedia Broadcasting) associated signal and an Internet associated signal, etc. Specifically, the Internet is indicative of a communication network to which a user easily gains access, such that the user can download specific Internet data using the data recording/reproducing device, and can use the downloaded data. The data recording/reproducing device may also record the external input signal on the disc.

As shown in FIG. 1, the data recording/reproducing device includes a pickup unit 11, a servo unit 14, a Radio frequency (R/F) unit 21, a signal processor 13, a memory 15 and a microprocessor (also called a microcomputer) 16. Further, the pickup unit 11 reads original data recorded on the disc 30 and management information such as a reproduction/management file information. The servo unit 14 controls operations of the pickup unit 11 according to signals from the microprocessor.

In addition, the R/F unit 21 generates a focus error signal for detecting the separation from a focus of a laser beam upon receiving an electric signal, generates a tracking error signal for detecting the separation from a track of the laser beam, filters/normalizes the electric signal, and slices the filtered/normalized result with a reference level, such that the R/F unit 21 outputs a digital RF signal.

The signal processor 13 receives the digital RF signal from the R/F unit 21, restores the received RF signal to a desired reproduction signal value, or modulates a signal to be recorded into another signal recorded on the disc, such that the signal processor 13 transmits the restored or modulated result. Further, the memory 15 stores a variety of information used for recording/reproducing data to and from the disc. The microprocessor 16 controls the overall operations of the pickup unit 11, the signal processor 13, the servo unit 14, the memory 15 and the R/F unit 21.

In addition, the pickup unit 11, the servo unit 14, the signal processor 13, the memory 15, the microprocessor 16, and the R/F unit 21 are also hereinafter referred to as a recording/reproducing unit. In addition, to reproduce or playback data, the recording/reproducing unit reads data from the disc 30 or a storage unit 19 according to a control signal of the controller 12, and provides the decoder 17 with the read data. In other words, the recording/reproducing unit serves as a reproducing unit (also called a player or reader) for reading data from the disc 30.

Also, to record data, the recording/reproducing unit receives a signal encoded by the AV encoder 18, and records video or audio data on the disc 30, so that it serves as a recording unit (also called a recorder). Further, the controller 12 (also called a host) controls the overall operations of the data recording/reproducing device, interfaces with a user to control a reproduction (or playback) operation of the recording medium, and controls the downloading of data existing outside of the disc 30 or storage unit 19 upon receiving a command from the user.

In more detail, the controller 12 transmits a command to the recording/reproducing unit via the interface unit 20, so that the recording/reproducing unit performs a specific function corresponding to the received command. The microprocessor 16 controls the elements of the recording/reproducing unit according to the above-mentioned command.

Further, the controller 12 and the microprocessor 16 may be separated from each other or the functions of the controller 12 and the microprocessor 16 may be combined such that the controller 12 and the microprocessor 16 are implemented as a single control unit. In addition, the controller 12 may be implemented with software (e.g., a program) and/or hardware contained in the data recording/reproducing device.

Also, the AV decoder 17 receives data from the disc 30 (recording medium) and/or the storage unit 19, and decodes the received data into output data according to a control signal of the controller 12. The AV decoder 17 may include a plurality of decoders according to data categories.

Therefore, to record a desired signal on the disc 30, the AV encoder 18 converts an input signal into a specific format signal (e.g., an MPEG2 transport stream) upon receiving a control signal from the controller 12, and transmits the converted result to the signal processor 13. Further, the storage unit 19 is a type of memory so that a user can store information or data and then use the stored information or data at a later time.

For example, the user may store personal data such as photographs, music recordings, etc. in the storage unit 19. The storage unit can be any type of memory such as a flash memory, a USB detachably connected to the data recording/reproducing device, a Hard Disk Drive (HDD) or a memory card. The storage unit 19 may also be used to store data associated with the disc 30. For example, the associated data may be downloaded from an external source. Data on the disc 30 may also be copied or moved to the storage unit 19.

Figure 2:
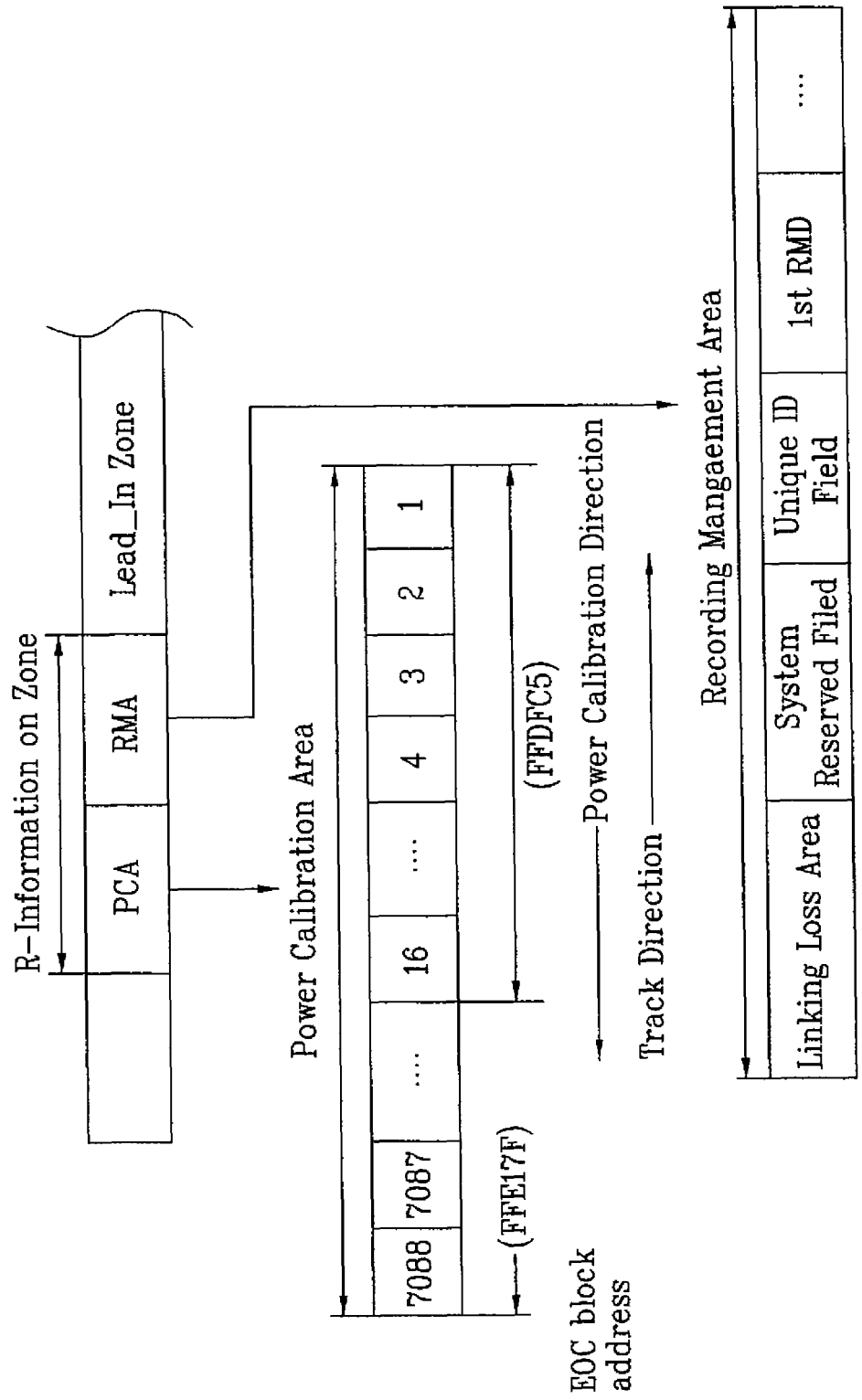
FIG. 2 is a structural diagram illustrating a recordable recording medium including a test area according to an embodiment of the present invention.

Next, FIG. 2 is a structural diagram illustrating a recordable recording medium including a test area according to an embodiment of the present invention. Specifically, FIG. 2 shows parts of the DVD-RW record layer as an example. FIG. 1 will also be referred to in the following description of the different embodiments of the present invention.

As shown in FIG. 2, a Power Calibration Area (PCA) is allocated to an inner and/or outer area of the recordable recording medium, and the PCA area is used as a test area for performing the OPC process. That is, upon receiving a record command for recording data in the recording/reproducing unit from the controller 12, the microprocessor 16 adjusts a laser diode (LD) power of the pickup unit 11, and records a predetermined test signal in the PCA area by controlling the pickup unit 11.

The controller 12 automatically performs a series of OPC operations to adjust a recording laser power by controlling the pickup unit 11, so that a beta ratio value indicating an asymmetry ratio of the RF signal read/detected by the recorded test signal is close to zero. Further, the above-mentioned OPC operation is performed per a predetermined-sized unit (e.g., 1-sector, 1-ECC block or 1-cluster). In other words, a single test unit (i.e., a test unit 1) from among the PCA area is used to perform the OPC once. Further, the test unit may be changed according to recording-medium standards or throughputs of the data recording/reproducing device.

In addition, the microprocessor 16 repeatedly performs a series of OPC operations to normally record data in the recording/reproducing unit whenever a new OPC process is needed. In this instance, the microprocessor 16 may use the test units contained in the PCA area in a predetermined order (e.g., in a reverse or forward order of a track direction). Also, the test units of the PCA area may be used at random.

The following description assumes the test units of the test area are used in a reverse order of the track direction of the recording medium. Further, the data recording/reproducing device can also read recording management data recorded on the recording medium to decide a test unit to be used for the OPC process.

For example, as shown in FIG. 2, the recording management data is recorded in a management area (e.g., a Recording Management Area (RMA)) allocated to a predetermined location of the recording medium. Therefore, the microprocessor 16 reads the recording management data from the RMA area by controlling the pickup unit 11, and uses the read recording management data to record/reproduce data.

Next, FIG. 3 is an example of recording-management data recorded in a management area of a recording medium according to an embodiment of the present invention. As shown in FIG. 3, a variety of OPC-associated information can be recorded as the recording management data in the RMD area, for example, the recording power acquired by the OPC process, a timestamp indicating a date and time at which the OPC process is executed, and a power calibration address for specifying a test unit at which the last power calibration is executed.

Further, the power calibration address may also specify the next available test unit, instead of specifying the test unit itself at which the last power calibration is executed. The following description assumes the power calibration address is equal to the location information specifying the test unit at which the last power calibration has been executed.

Figure 4:
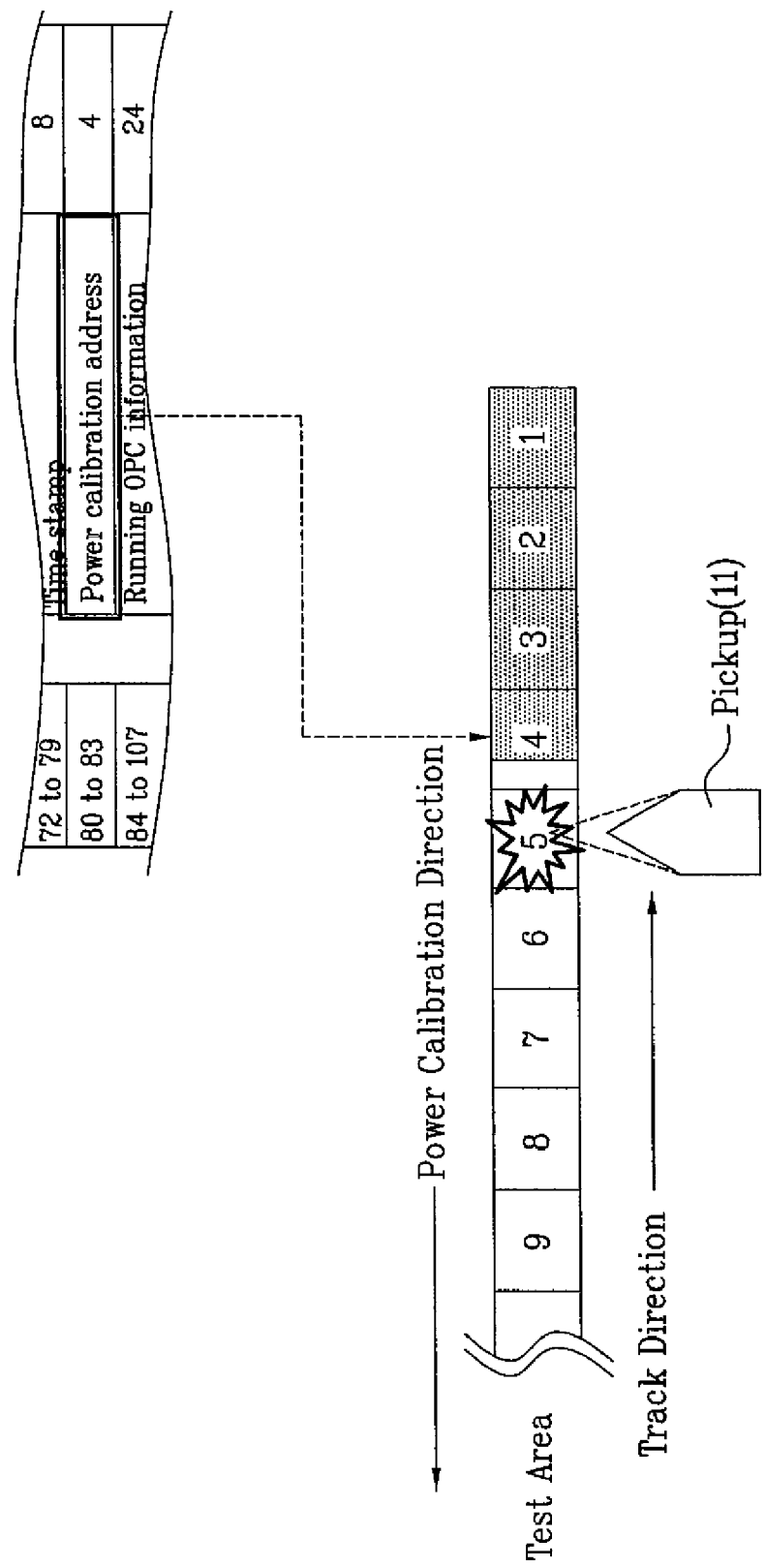
FIG. 4 is a conceptual diagram illustrating an OPC process using recording-management data and a test area according to an embodiment of the present invention.

FIG. 4 is a conceptual diagram illustrating an OPC process using recording-management data and a test area according to an embodiment of the present invention. Referring to FIG. 4, when the recording medium is seated or inserted in the data recording/reproducing device, the microprocessor 16 receives a record command from the controller 12, and reads recording management data from the management area of the recording/reproducing unit by controlling the pickup unit 11. The recording management data may also then be stored in the memory 15, so that the data can be used to record/reproduce data to and from the recording medium.

Figure 5:
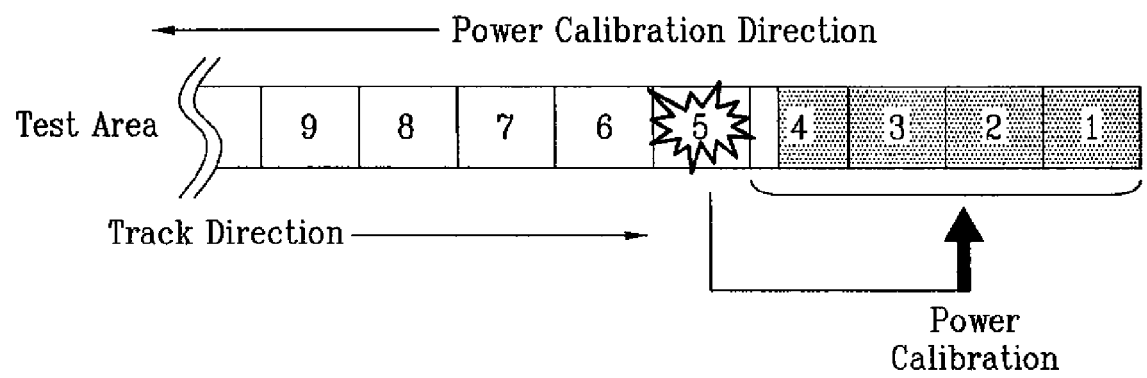
FIG. 5 is a conceptual diagram of recording management data in a test area according to an embodiment of the present invention.

Further, the microprocessor 16 decides at which test unit the OPC process will be executed by referring to the power calibration address contained in the recording management data. In addition, the microprocessor 16 may decide the test unit to be an unused test unit or a test unit erased after the OPC procedure. For example, and as shown in FIG. 5, if the power calibration address indicates a start address of a fourth test unit (i.e., test unit 4), a fifth test unit (i.e., test unit 5) is determined to be the test unit at which the OPC process will be executed.

Further, to perform the OPC process, the microprocessor 16 controls the pickup unit 11, so that the pickup unit 11 accesses the test unit 5 from several test units on the recording medium. The microprocessor 16 then controls the pickup unit 11, so that the pickup unit 11 records the test signal in the test unit 5 and reads the recorded test signal.

Also, when the controller 12 transmits the record command to the recording/reproducing unit, the recording/reproducing unit uses some parts of the memory 15 as a buffer, so that the data is buffered in real time. Further, the time consumed for the OPC process is limited, because of a limited size of the buffer. In other words, when the OPC process is continuously performed for more than a predetermined amount of time, the microprocessor determines the OPC process has failed.

However, when a defect exists in the test unit 5, the above-mentioned time limitation may elapse, because the controller 12 does not search for a target address at which the OPC process will be executed. In this instance, a buffer overflow error occurs, so that the recording/reproducing unit can not successfully record data on the disc.

The memory 15 may be increased in size to address this problem, but the additional memory makes the recording/reproducing unit more expensive. Also, the delay of the OPC execution time may delay the recording start time, so that the time consumed for all recording operations also increases, resulting in an increased recording time.

Further, even though the microprocessor 16 may search for the address of the test unit 5 within the time limitation and record the record signal in the test unit 5, an effective optimum laser power may not be calculated due to the above-mentioned defect, so that the OPC process is not started.

Therefore, to prevent OPC and recording failures generated due to the defects contained in the test area, when a test unit decided by the power calibration address has an unexpected defect, a test unit in which the OPC process has already been successfully performed is used for the OPC process. These features will be described in more detail with respect to FIGS. 5 and 6.

Figure 6:
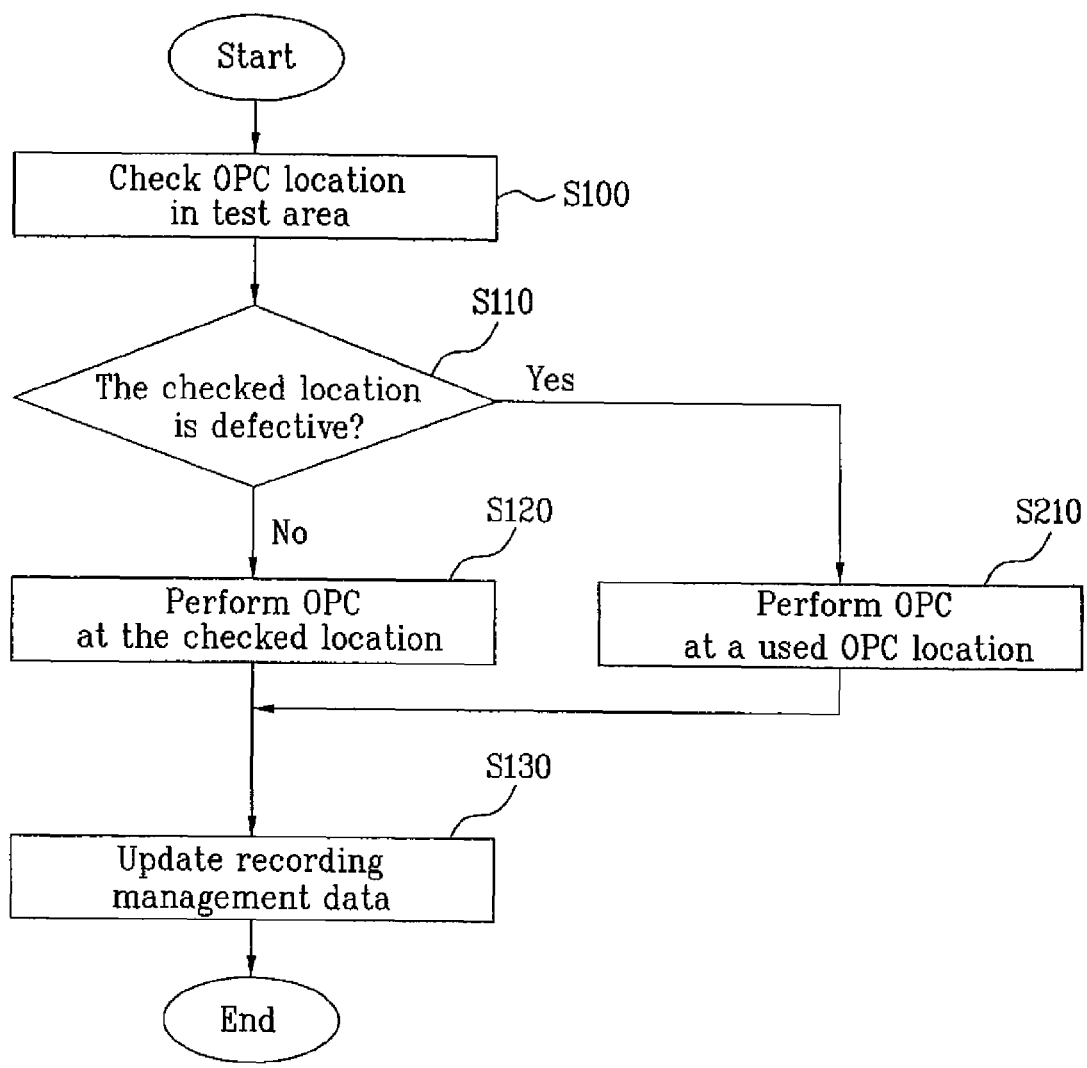
FIG. 6 is a flowchart illustrating a method of recording management data in a test area as shown in FIG. 5.

In more detail, FIG. 5 is a conceptual diagram of recording management data in a test area according to an embodiment of the present invention, and FIG. 6 is a flowchart illustrating a method of recording management data in a test area as shown in FIG. 5.

In FIGS. 5 and 6, when a recording medium is seated in the data recording/reproducing device, the microprocessor 16 determines whether the recording medium is a recordable recording medium by referring to recording-medium information (also called disc information (DI)) embossed on the recording medium.

When the microprocessor 16 determines the recording medium is a recordable recording medium, the controller 12 transmits a record command for recording data on the recording medium to the microprocessor 16 via the interface unit 20. Then, the microprocessor 16 determines an OPC location of the test area of the recording medium based on the OPC-associated location information stored on the recording medium (step S100), so that the OPC process for determining an optimum laser power is executed at the OPC location. For example, and as shown in FIG. 5, the test unit 5 may be used as the OPC location.

The microprocessor 16 then pre-scans the selected test area and determines if the selected test unit 5 is defective (step S110). If the microprocessor 16 determines the test unit 5 has no defect (No in step S110), the microprocessor 16 controls the pickup unit 11 so that the OPC process is executed at the test unit 5 (step S120).

However, if the microprocessor 16 determines the test unit 5 has a defect (Yes in step S110), the microprocessor 16 controls the pickup unit 11, so that the OPC process is executed at any one of the already used test units 1-4 (step S210).

For example, assume the test unit 1 is used for the OPC process in place of the defective test unit 5. Then, when the recording management data is updated, the OPC process can be completed at step S130. In other words, the microprocessor 16 updates the recording power, the timestamp, the power calibration address, etc. according to the OPC process, and controls the pickup unit 11, so that the updated recording management data is recorded in the management area of the recording medium.

Figure 7:
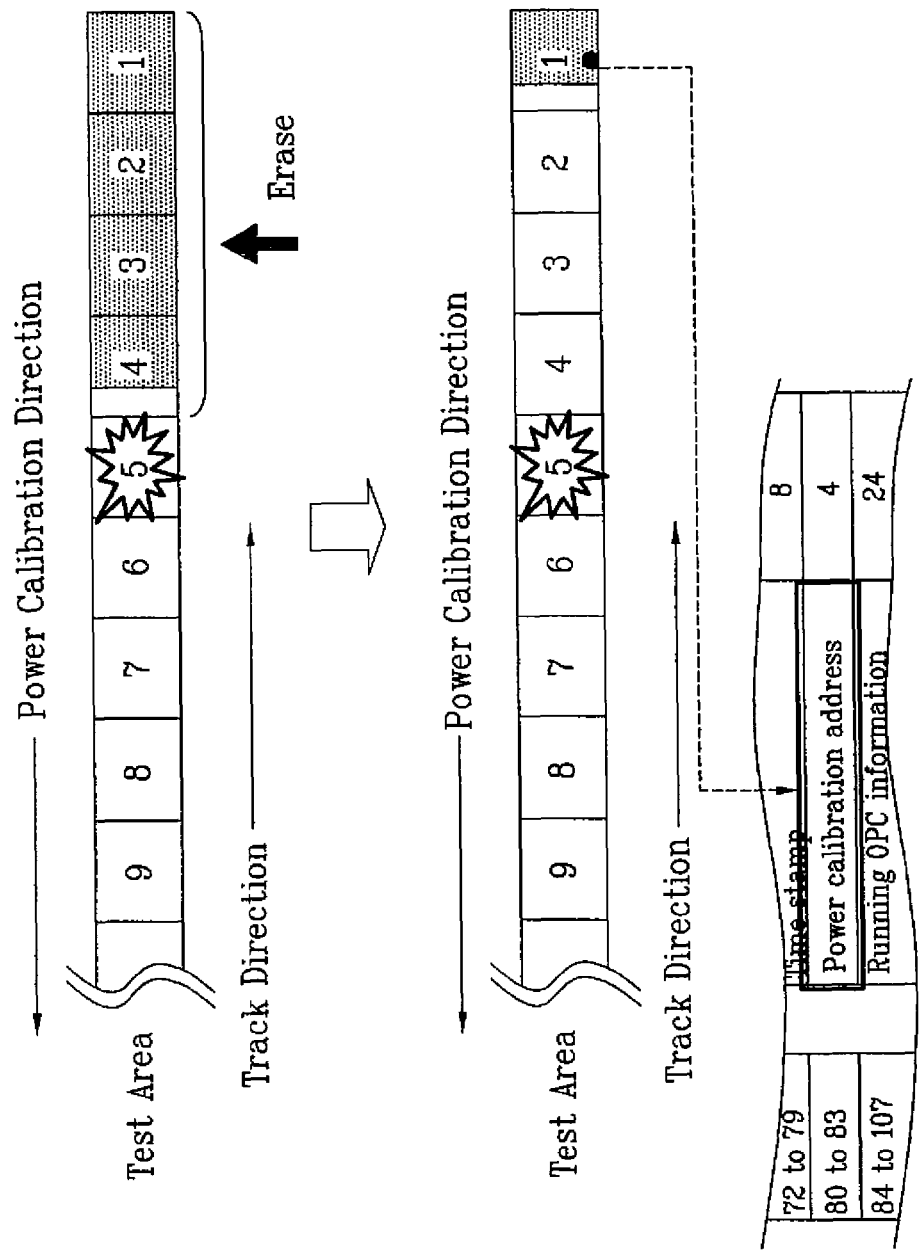
FIG. 7 is a conceptual diagram of recording management data in a test area according to another embodiment of the present invention.
Figure 8:
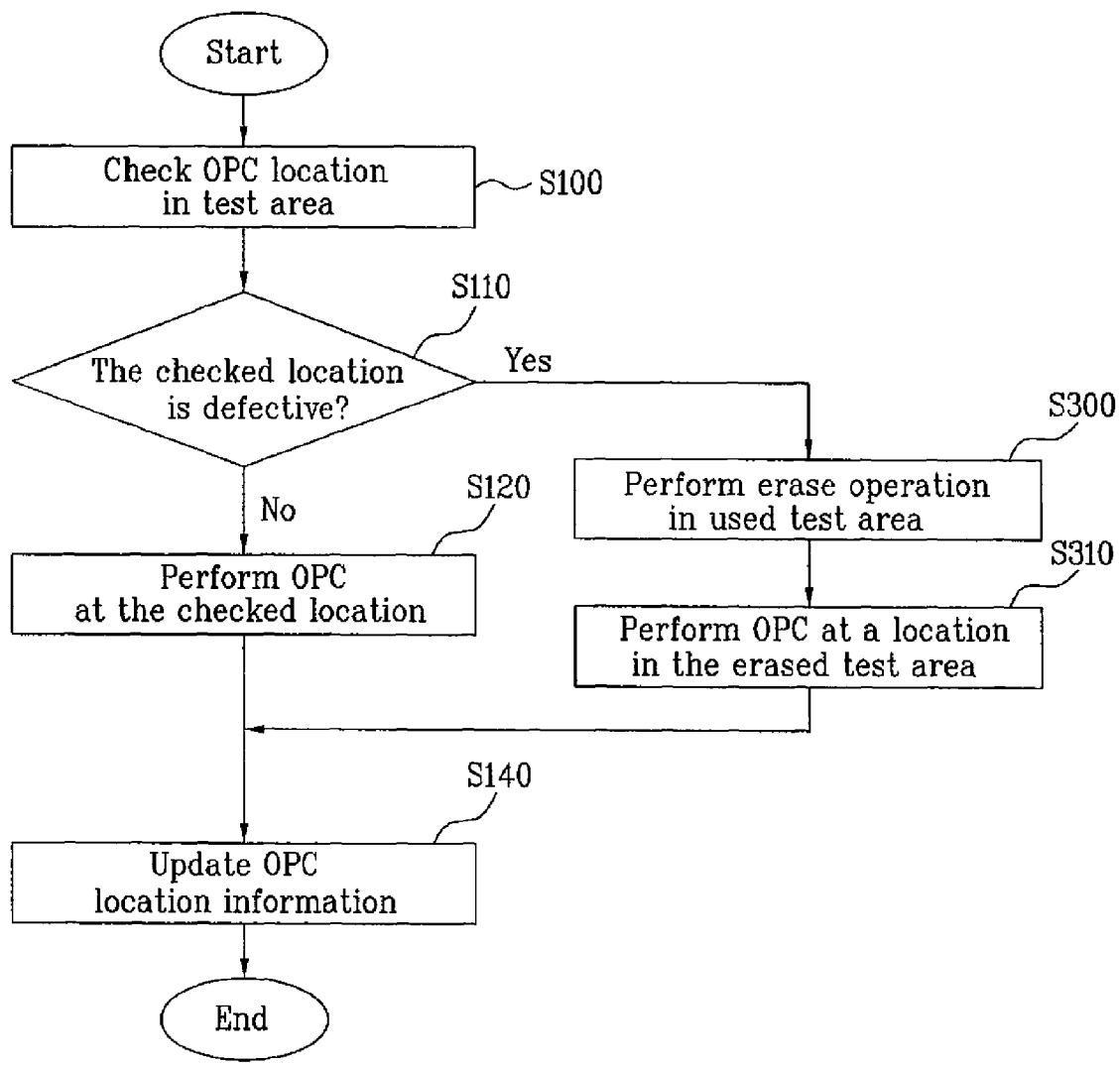
FIG. 8 is a flowchart illustrating a method of recording management data in a test area as shown in FIG. 7.

Next, FIG. 7 is a conceptual diagram of recording management data in a test area according to another embodiment of the present invention, and FIG. 8 is a flowchart illustrating a method of recording management data in a test area as shown in FIG. 7.

In FIGS. 7 and 8, the steps S100, S110 and S120 described above with respect to FIG. 6 are also performed in this embodiment. That is, when the controller 12 transmits a record command for recording data on the recording medium to the microprocessor 16 via the interface unit 20, the microprocessor 16 determine an OPC location of the test area of the recording medium to be the test unit 5 by referring to the OPC-associated location information stored in the recording medium (step S100), so that the OPC process (OPC procedure) for determining an optimum laser power is executed at the OPC location.

Then, the microprocessor 16 scans the identified test area, seeks the location or the address of the test unit 5, records the test signal in the test unit 5, or reproduces the recorded signal, so that the microprocessor 16 determines whether the test unit 5 is defective (step S110). If the test unit 5 is determined non-defective (No in step S110), the OPC process is executed at the test unit 5 (step S120). Further, the location information of the test unit 5 is recorded as the last power calibration location in the recording medium (step S140). Therefore, the test unit to be used for the next OPC process will be the test unit 6.

In addition, when the test unit 5 is determined to be defective (Yes in S110), the microprocessor 16 moves the pickup unit 11 to the location of valid test units (i.e., the test units 1-4), which have been determined to be non-defective, and the OPC process is executed at one of the valid test units 1-4. Further, the valid test units are determined to be non-defective, because they have been previously used for an OPC process.

In addition, prior to performing the above-mentioned OPC process, the microprocessor 16 adjusts the laser power of the pickup unit 11 to be an erase power to exclude the influence of a previous OPC, so that OPC test data is erased from the test units 1-4 (step S300). Then, the OPC process is executed at one of the erased test units 1-4 (step S310). Further, an erase power determined from the previous OPC, a default erase power stored in recording-medium information DI of the recording medium, etc. are applicable as the erase power step S300.

Further, the OPC process is completed by updating the recording management data in the recording management area. Specifically, the OPC-associated location information from among the recording management data is updated with the location information of the test unit 1 at step S140. Thereafter, when the OPC process for the above-mentioned recording medium is again executed, the data recording/reproducing device determines the test unit 2 as the OPC location based on the updated location information.

Figure 9:
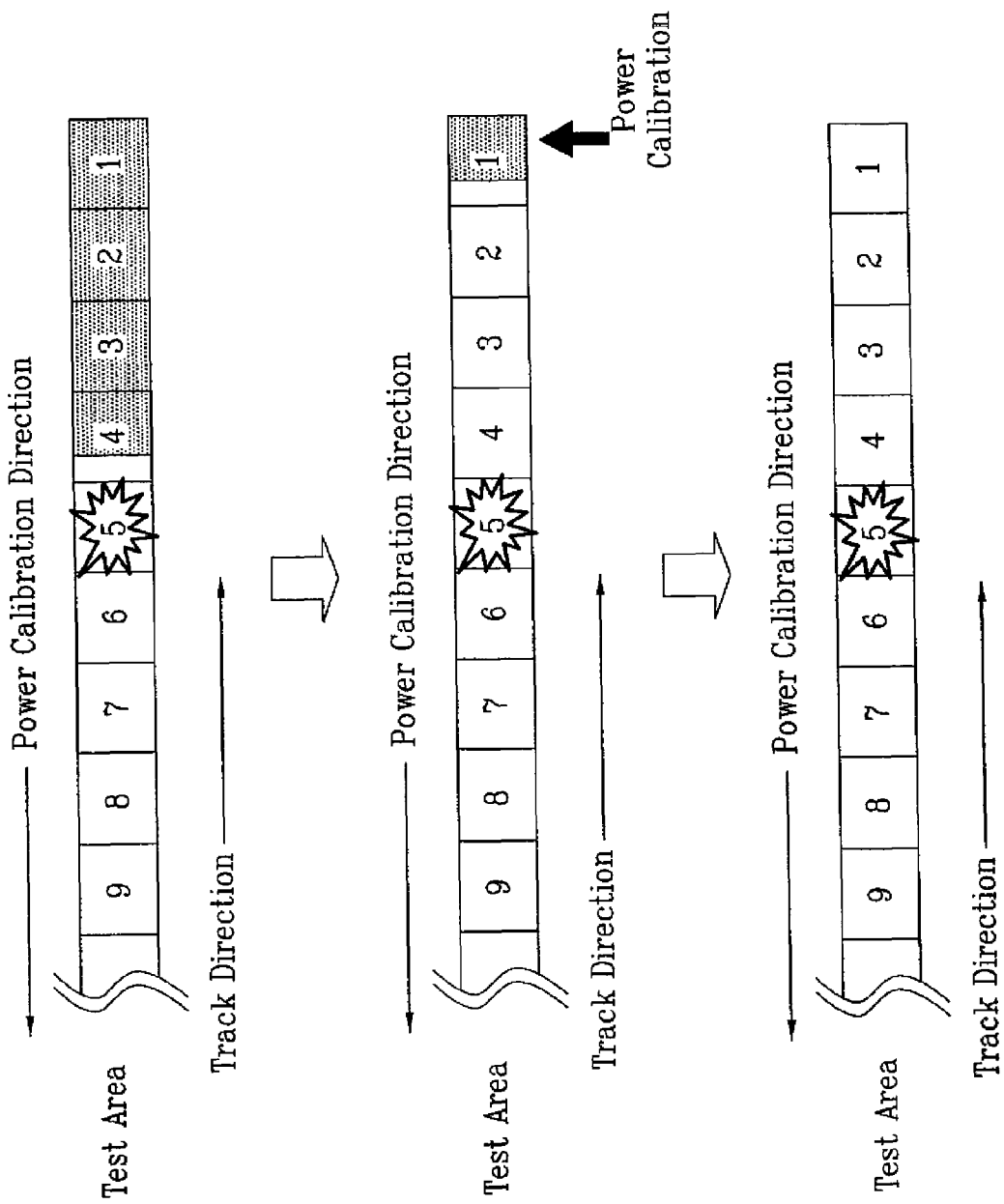
FIG. 9 is a conceptual diagram of recording management data in a test area according to yet another embodiment of the present invention.
Figure 10:
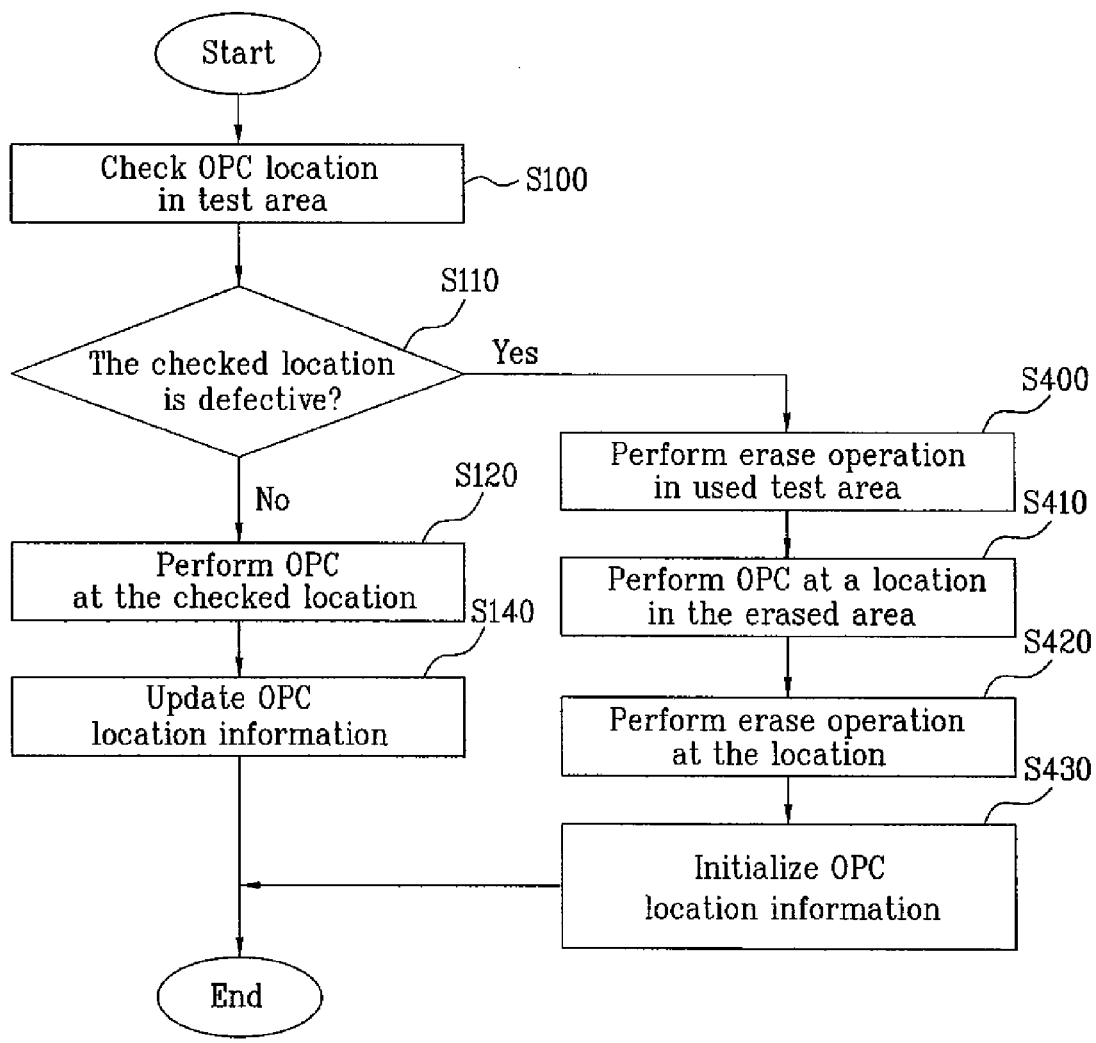
FIG. 10 is a flowchart illustrating a method of recording management data in a test area as shown in FIG. 9.

FIG. 9 is a conceptual diagram of recording management data in a test area according to yet another embodiment of the present invention, and FIG. 10 is a flowchart illustrating a method of recording management data in a test area as shown in FIG. 9.

The steps S100, S110, S120 and S140 are similar to the previous embodiment. Accordingly, a detailed description of these steps will be omitted. Further, as shown in FIG. 10, when there is a defect in the test unit 5 at which the OPC is to be executed (Yes in step S110), the microprocessor 16 moves the pickup unit 11 to the location of valid test units (i.e., the test units 1-4), so that the OPC process is executed at one of the test units 1-4.

Further, in this instance, the valid test units are indicative of test units at which the OPC has already been executed and ascertained non-defective. As described above, to remove the influence of a previous OPC, the microprocessor 16 controls the pickup unit 11 so that an erase operation is performed in the test units 1-4 at step S400. That is, the test units 1-4 are erased by irradiating the test units using an optimum erase power.

Then, the microprocessor 16 controls the pickup unit 11, so that the OPC process is executed at the test unit 1 from among the erased test units 1-4 (step S410). If the OPC process is completed, the microprocessor 16 controls the laser power of the pickup unit 11 to be set to an optimum erase power, and controls the pickup unit 11 so that the test unit 1 is erased. FIG. 9 illustrates these processes.

The microprocessor 16 finishes the above-mentioned OPC process by updating the recording management data of the recording medium with new data. That is, because the test units 1-4 are erased, the test area returns to an initial status provided before the OPC process is executed. As a result, the OPC-associated location information from among the recording management data is set to an initial value (e.g., 00) provided before the first OPC is executed in the test area (step S430).

When the next OPC is required for the recording medium, the data recording/reproducing device determines the test unit 1 to be a specific test unit at which the next OPC will be executed, because the OPC-associated location information has been set to the initial value.

Figure 11:
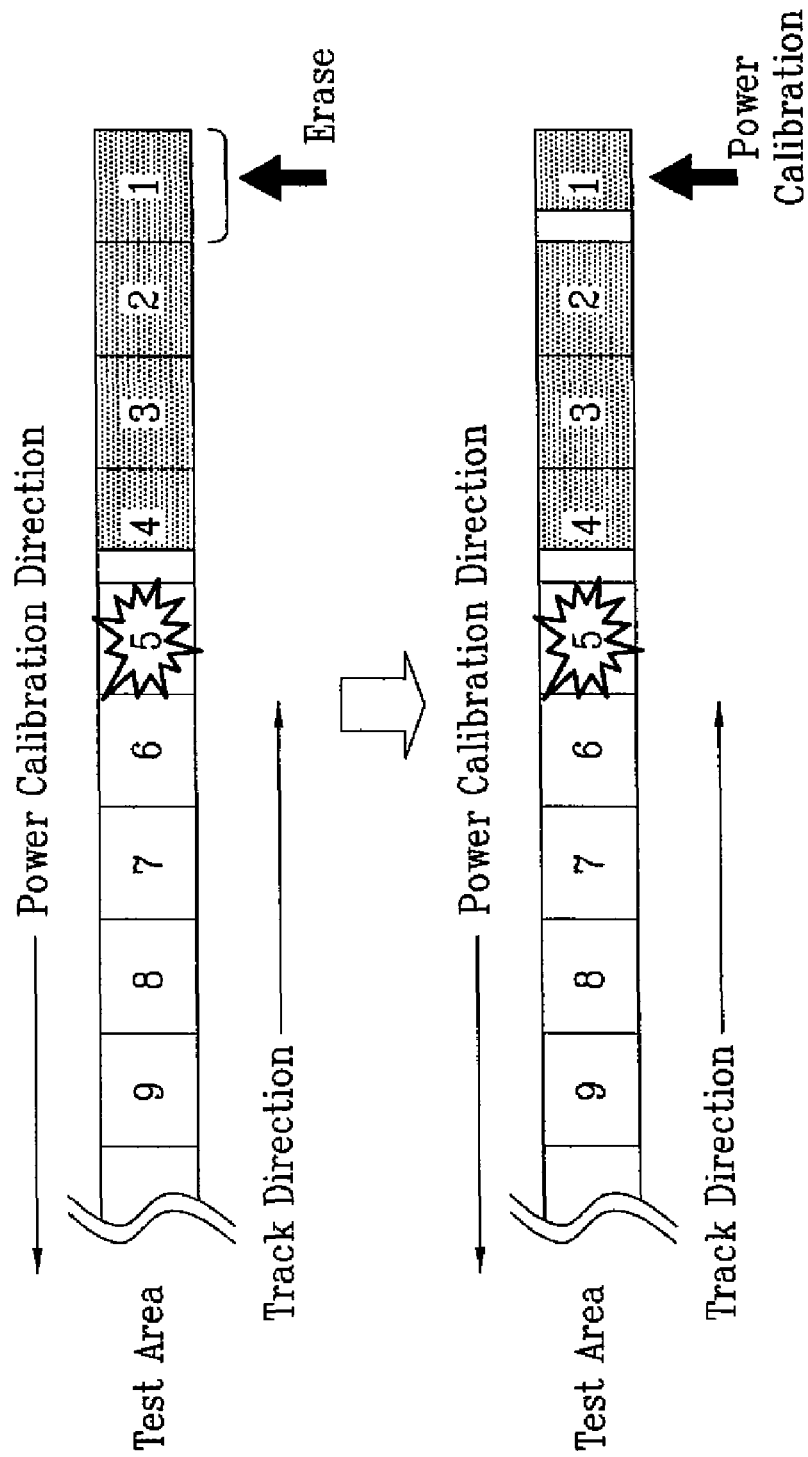
FIG. 11 is a conceptual diagram of recording management data in a test area according to another embodiment of the present invention.
Figure 12:
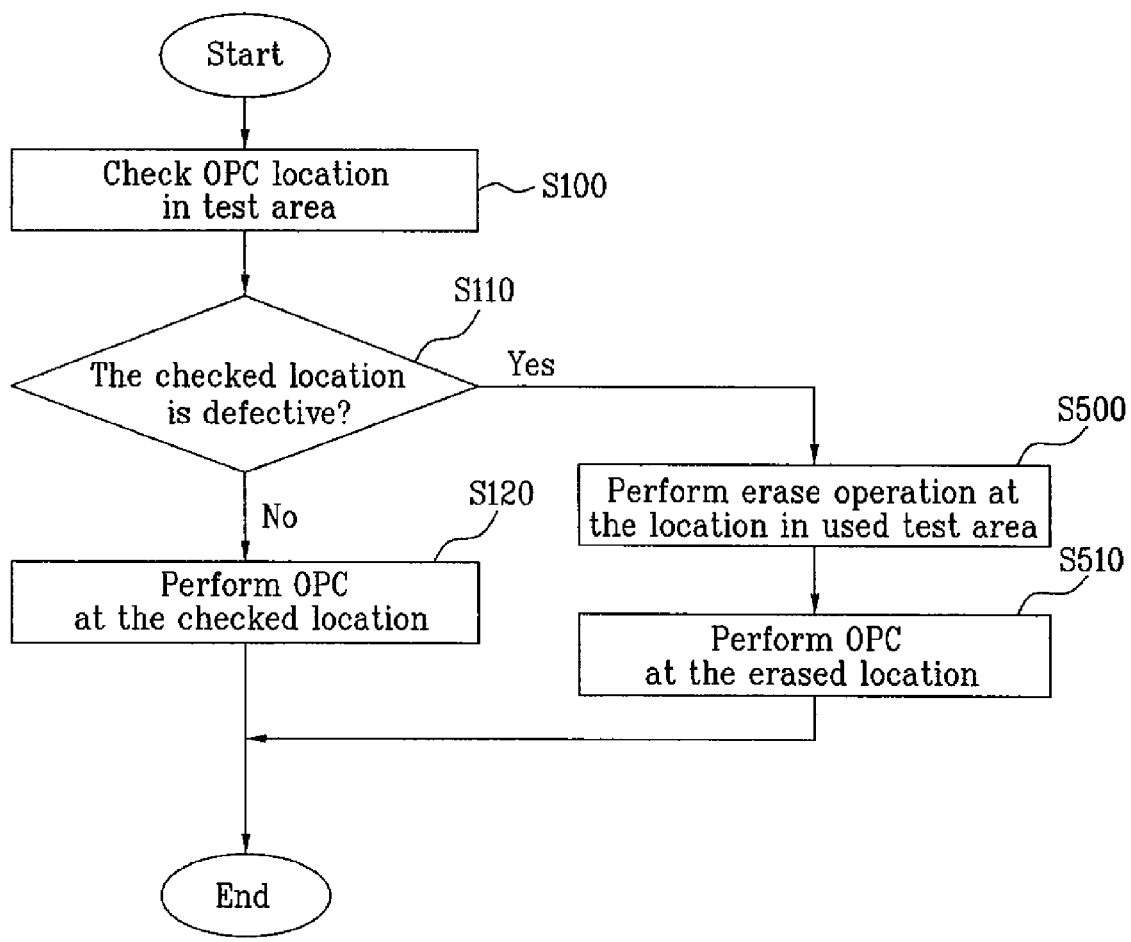
FIG. 12 is a flowchart illustrating a method of recording management data in a test area as shown in FIG. 11.

FIG. 11 is a conceptual diagram of recording management data in a test area according to another embodiment of the present invention, and FIG. 12 is a flowchart illustrating a method of recording management data in a test area as shown in FIG. 11. Again, steps S100, S110 and S120 are similar to the same steps described in the other embodiments, and thus a detailed description of these steps is omitted.

As shown in FIG. 12, when the test unit 5 at which the OPC process will be executed is defective (Yes in step S110), the microprocessor 16 controls the pickup unit 11 to perform an erase operation using an optimum erase power at the test unit 1 at which the OPC is to be executed rather than using the defective test unit 5 (step S500), and performs the OPC process on the erased test unit 1 (step S510). Similar to the above description, the test unit 1 is decided as a valid test unit, because it has been successfully used in a previous OPC process.

Further, the recording power and the timestamp from among the recording management data of the recording medium is updated. However, the OPC-associated location information is omitted. Thus, when the next OPC is required for the recording medium, the data recording/reproducing again tries the test unit 5 and determines the test unit 5 is defective. Therefore, the erase operation is performed to one of the test units 1-4 according to the above-mentioned process, and the OPC process is executed again. FIG. 11 also illustrates the OPC process according to this embodiment.

Figure 13:
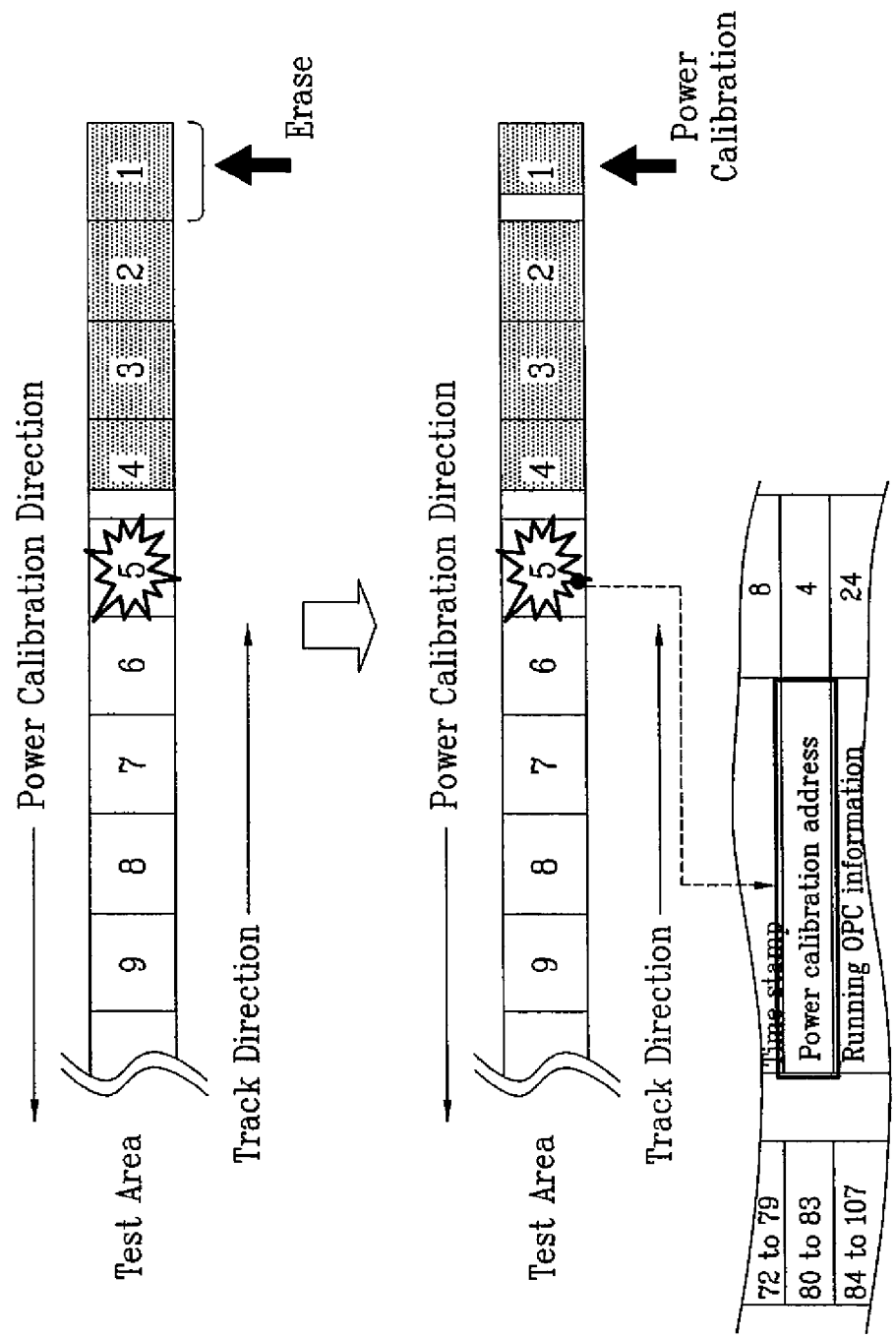
FIG. 13 is a conceptual diagram of recording management data in a test area according to still another embodiment of the present invention.
Figure 14:
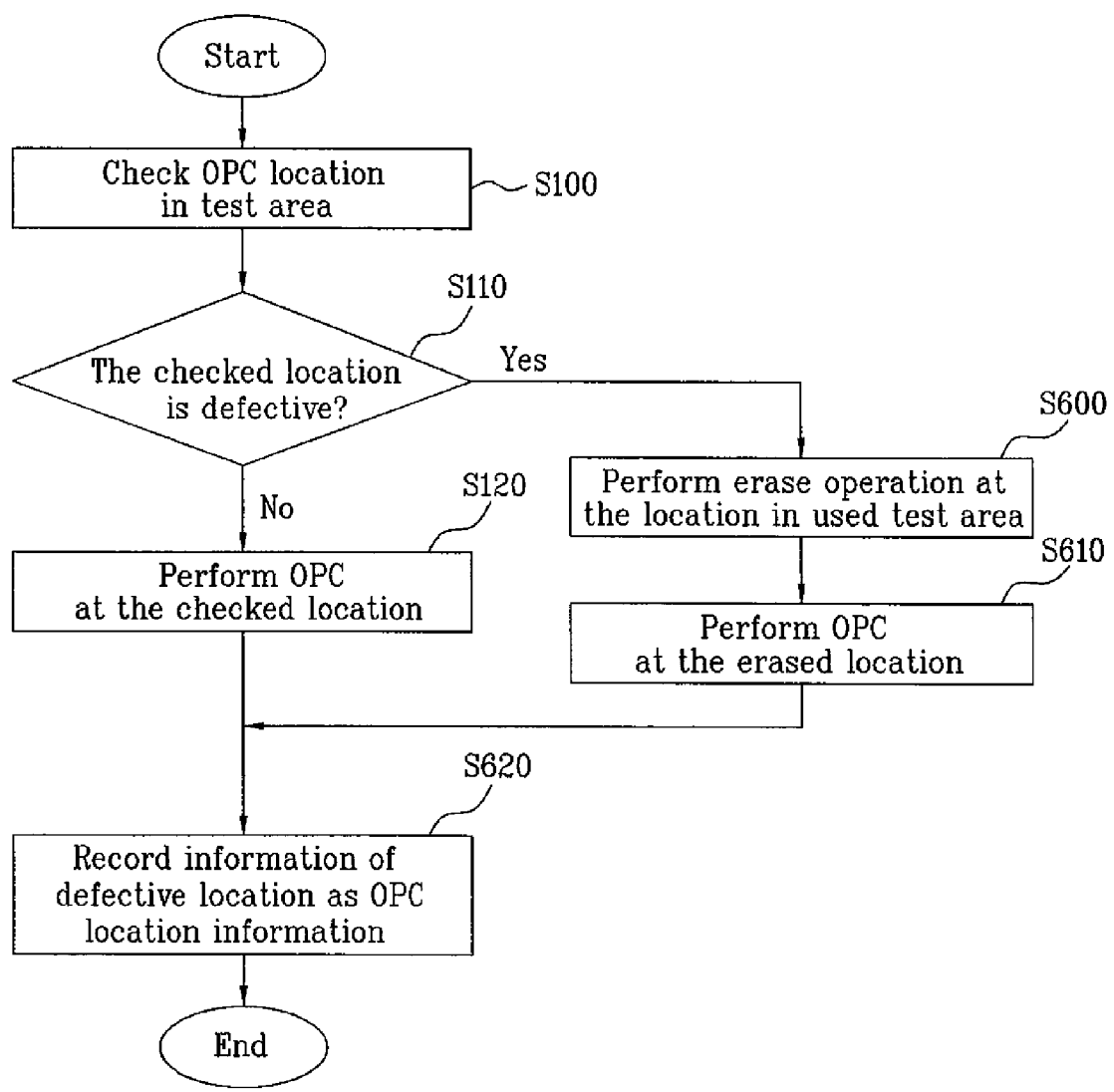
FIG. 14 is a flowchart illustrating a method of recording management data in a test area as shown in FIG. 13.

FIG. 13 is a conceptual diagram of recording management data in a test area according to still another embodiment of the present invention, and FIG. 14 is a flowchart illustrating a method of recording management data in a test area as shown in FIG. 13. The steps S100, S110 and S120 are similar to the same steps in the other FIGS. and accordingly a detailed description of these steps is omitted.

As shown in FIG. 14, when the test unit 5 is determined to be defective (Yes in S110), the microprocessor 16 controls the pickup unit 11 to perform an erase operation to the test unit 1 at which the OPC is to be executed rather than the using the defective test unit 5 (step S600), and the OPC process is executed at the test unit 1 (step S610). The steps 600 and 610 are similar to the steps 500 and 510 in FIG. 12. However, in this embodiment, the power calibration address contained in the recording management data is updated with location information of the defective test unit 5, and the updated result is recorded on the recording medium (step S620). FIG. 13 also illustrates the features of this embodiment.

Therefore, when the next OPC is required for the recording medium, the data recording/reproducing device will decide the test unit 6 located after the test unit 5 as the next OPC test unit.

Figure 15:
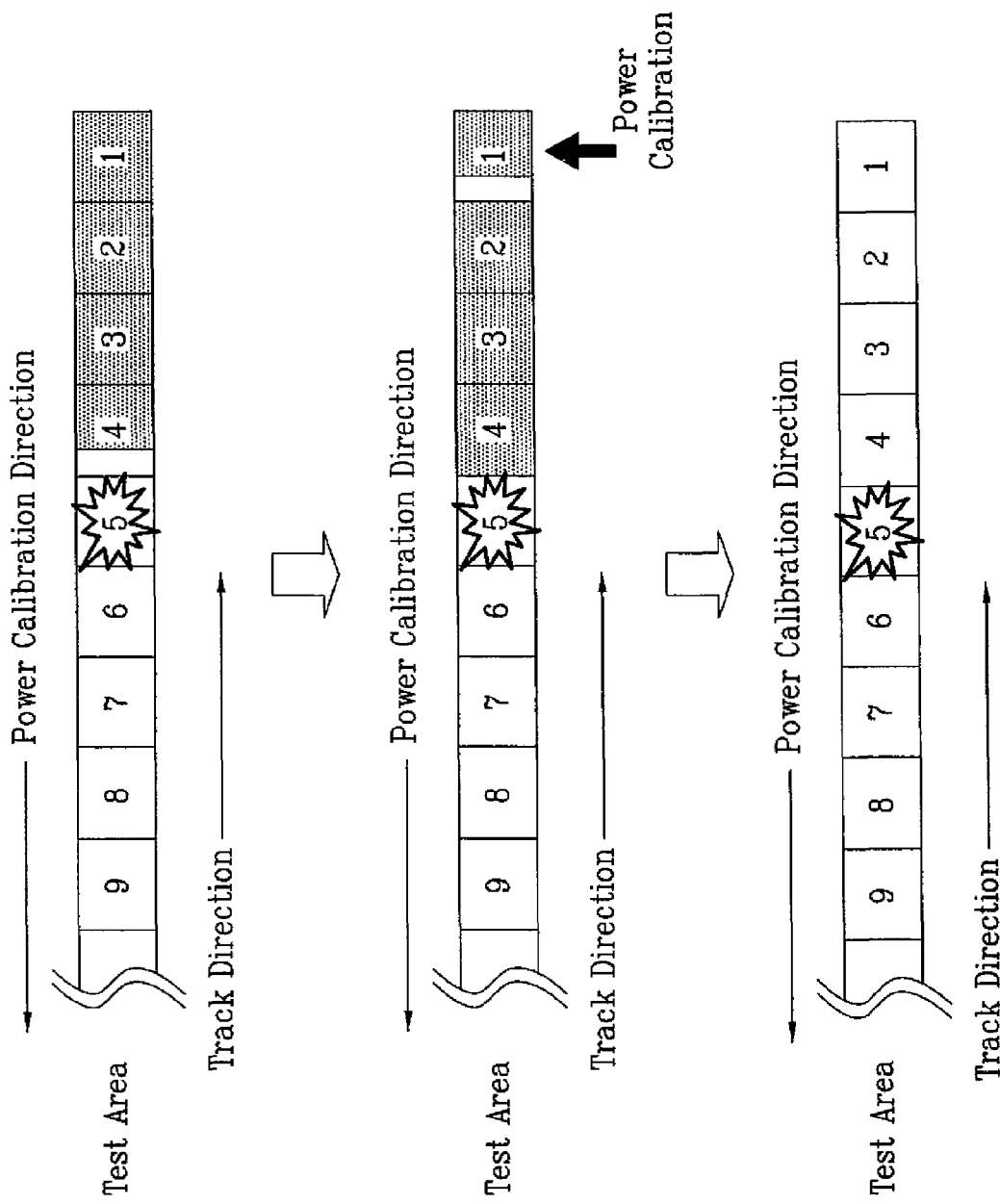
FIG. 15 is a conceptual diagram of recording management data in a test area according to another embodiment of the present invention.
Figure 16:
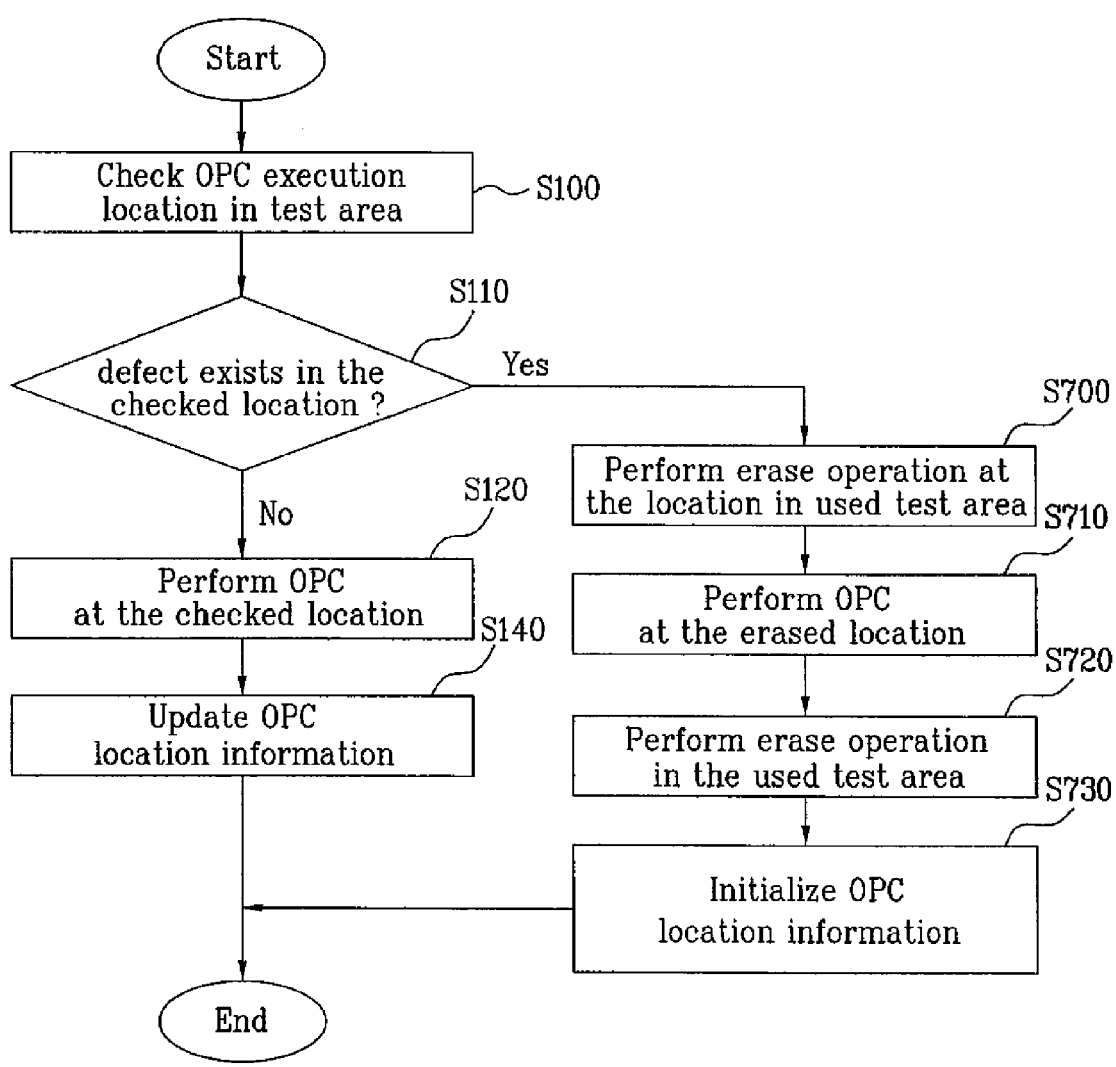
FIG. 16 is a flowchart illustrating a method of recording management data in a test area as shown in FIG. 15.

Next, FIG. 15 is a conceptual diagram of recording management data in a test area according to another embodiment of the present invention, and FIG. 16 is a flowchart illustrating a method of recording management data in a test area as shown in FIG. 15. Steps S100, S110, S120, and S140 have already been described in detail.

Referring to FIG. 16, when the test unit 5 at which the OPC is to be executed is defective (Yes in step S110), the microprocessor 16 controls the pickup unit 11 to perform an erase operation to the test unit 1 from among the test units 1-4, which are valid test units having no defects (S700). The microprocessor 16 also controls the pickup unit 11 so that the OPC process is executed at the erased test unit 1 (step S710).

When the OPC process is completed, the microprocessor 16 controls the laser power of the pickup unit 11 to be set to an optimum erase power, and controls the pickup unit 11 so that the test units 1-4 are erased (step S720). Further, because the test units 1-4 that have been used for OPC processes are erased, the test area returns to an initial status provided before the OPC process is executed. As a result, the OPC-associated location information of the recording management data is set to an initial value (e.g., 00) provided before the first OPC is executed in the test area (step S730).

When the next OPC is required for the recording medium, the data recording/reproducing device determines the test unit 1 to be a specific test unit at which the next OPC will be executed, because the OPC-associated location information has been set to the initial value.

The above-description refers to a specific case in which the test area is used in a predetermined order (i.e., the test units of the test area are used in a predetermined order). However, when the data recording/reproducing device can distinguish a test unit at which the OPC has been executed from a test area of the recording medium, the embodiments of the present invention can be applied to the above-mentioned test area although the test area is used at random.

Figure 17:
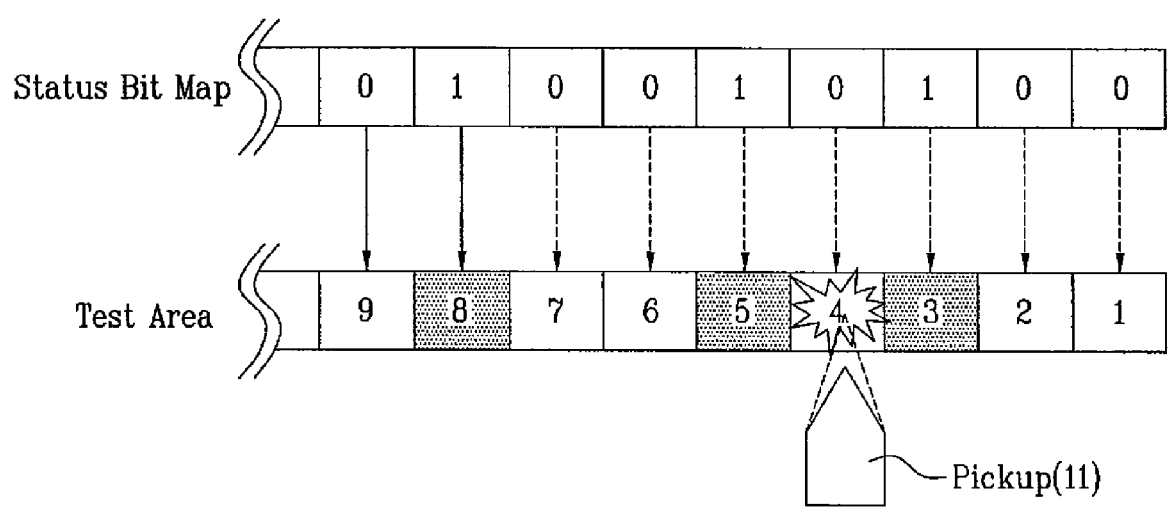
FIG. 17 is a conceptual diagram of recording management data in a test area according to another embodiment of the present invention.

For example, FIG. 17 is a conceptual diagram of recording management data in a test area according to another embodiment of the present invention. In this embodiment, the recording medium of the present invention includes a status bitmap indicating whether a test unit has been used for the OPC process as recording management data in the test area. The individual bits of the status bitmap may correspond to the test units of the test area on a one-to-one basis, respectively. Further, each bit of the status bitmap indicates whether a corresponding test unit has already been used for the OPC process.

For example, if test units 3, 5, and 8 from among the test area have already been used during the previous OPC process, the bits corresponding to the test units 3, 5 and 8 from among the status bitmap indicate the value of "1", and the remaining bits indicate the value of "0", so that the status of a corresponding test unit can be indicated.

Upon receiving a record command from the controller 12, the microprocessor 16 decides to perform the OPC process at the test unit 4 from among the test units corresponding to the "0"-indicated bits contained in the status bitmap. If a defect exists in the test unit 4, the microprocessor 16 performs the OPC process at one of the test units 3, 5 and 8 that is determined to be non-defective by referring to the status bitmap so that the microprocessor 16 decides an optimum laser power.

Similar to the previous embodiments in which the test units have been used in a predetermined order, the microprocessor 16 terminates the OPC process and updates the recording management data on the recording medium.

In addition, the above-described updated processes may be skipped and not performed.

Therefore, even though a defect exists in a test area of a recording medium, the present invention finds a target address at which the OPC is to be executed in the test area within an OPC time limitation, and therefore the OPC process is stably performed at the selected target address within the OPC limitation time. Further, the advantageous OPC process can be performed without increasing the memory capacity of the recording/reproducing device.

Further, according to embodiments of the present invention, the OPC process is performed in a reduced amount of time, and the overall time consumed for the recording operation is decreased. In addition, even though a defect exists in a test area, the present invention still efficiently determines an effective optimum laser power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for determining an optimum laser power for a recording medium, the method comprising:
   checking if a portion of an unused area in a test area on the recording medium is defective; and
   performing an optimum laser power operation in a used area in the test area, said used area being a non-defective area that was previously used to test the optimum laser power for the recording medium.

2. The method of claim 1, wherein the performing step comprises:
   erasing at least a portion of the used area of the test area; and
   performing the optimum laser power operation in the erased portion of the used area of the test area.

3. The method of claim 1, wherein the portion of the used area of the test area comprises an ECC (Error Correction Code) block.

4. The method of claim 2, wherein the erasing step erases all portions of the used area of the test area.

5. The method of claim 1, further comprising:
   updating a recording management area on the recording medium to include information indicating where the optimum laser power operation has been recently performed such that a next optimum laser power operation is performed in a next adjacent area of the used area.

6. The method of claim 2, wherein after performing the optimum laser power operation in the erased portion of the used area of the test area, the method further comprises:
   erasing the portion that was used to perform the optimum laser power operation.

7. The method of claim 6, further comprising:
   updating a recording management area on the recording medium to include information indicating that a next optimum laser power operation is to be performed at the erased portion.

8. The method of claim 2, further comprising:
   skipping an updating process of a recording management area including information indicating where the optimum laser power operation has been recently performed.

9. The method of claim 2, further comprising:
   updating a recording management area on the recording medium to include information indicating where the defective portion of the unused area is located such that a next optimum laser power operation is performed in a next adjacent portion in the unused area.

10. The method of claim 4, further comprising:
    updating a recording management area on the recording medium to include information indicating that a next optimum laser power operation is to be performed at a beginning of the erased portion.

11. An apparatus for determining an optimum laser power for a recording medium, the apparatus comprising:
    a pickup unit configured to record data on the recording medium and to read data from the recording medium; and
    a controller configured to check if a portion of an unused area in a test area on the recording medium is defective, and to perform an optimum laser power operation in a used area in the test area,
    wherein the used area is a non-defective area that was previously used to test the optimum laser power for the recording medium.

12. The apparatus of claim 11, wherein the controller is configured to perform the optimum laser power operation by erasing at least a portion of the used area of the test area, and performing the optimum laser power operation in the erased portion of the used area of the test area.

13. The apparatus of claim 11, wherein the portion of the used area of the test area comprises an ECC (Error Correction Code) block.

14. The apparatus of claim 12, wherein the controller is further configured to erase all portions of the used area of the test area.

15. The apparatus of claim 11, wherein the controller is further configured to update a recording management area on the recording medium to include information indicating where the optimum laser power operation has been recently performed such that a next optimum laser power operation is performed in a next adjacent area of the used area.

16. The apparatus of claim 12, wherein after the controller performs the optimum laser power operation in the erased portion of the used area of the test area, the controller is further configured to erase the portion that was used to perform the optimum laser power operation.

17. The apparatus of claim 16, wherein the controller is further configured to update a recording management area on the recording medium to include information indicating that a next optimum laser power operation is to be performed at the erased portion.

18. The apparatus of claim 12, wherein the controller is further configured to skip an updating process of a recording management area including information indicating where the optimum laser power operation has been recently performed.

19. The apparatus of claim 12, wherein the controller is further configured to update a recording management area on the recording medium to include information indicating where the defective portion of the unused area is located such that a next optimum laser power operation is performed in a next adjacent portion in the unused area.

20. The apparatus of claim 14, wherein the controller is further configured to update a recording management area on the recording medium to include information indicating that a next optimum laser power operation is to be performed at a beginning of the erased portion.

21. A system for determining an optimum laser power for a recording medium, the system comprising:
    means for checking if a portion of an unused area in a test area on the recording medium is defective; and
    means for performing an optimum laser power operation in a used area in the test area, said used area being a non-defective area that was previously used to test the optimum laser power for the recording medium.

22. The system of claim 21, wherein the means for performing comprises:
    means for erasing at least a portion of the used area of the test area; and
    means for performing the optimum laser power operation in the erased portion of the used area of the test area.

23. The system of claim 21, further comprising:
    means for updating a recording management area on the recording medium to include information indicating where the optimum laser power operation has been recently performed such that a next optimum laser power operation is performed in a next adjacent area of the used area.

24. The system of claim 22, wherein after performing the optimum laser power operation in the erased portion of the used area of the test area, the system further comprises:
means for erasing the portion that was used to perform the optimum laser power operation.

25. The system of claim 24, further comprising:
means for updating a recording management area on the recording medium to include information indicating that a next optimum laser power operation is to be performed at the erased portion.

* * * * *